United States Patent [19]

Allyn

[11] 4,034,334
[45] July 5, 1977

[54] AIRFOIL POSITION RANGE SELECTING, INDICATING AND WARNING SYSTEM FOR AN AIRCRAFT

[75] Inventor: Donald Cooper Allyn, Bellevue, Wash.

[73] Assignee: The Boeing Company, Seattle, Wash.

[22] Filed: July 14, 1975

[21] Appl. No.: 595,505

[52] U.S. Cl. .................................. 340/27 R; 73/65
[51] Int. Cl.² ...................................... G08G 5/00
[58] Field of Search .......... 340/27 R; 73/65, 178 T; 244/77 A, 77 E, 77 F, 111, 127, 177, 178; 235/150.2, 150.22

[56] References Cited

UNITED STATES PATENTS

| | | | |
|---|---|---|---|
| 3,051,416 | 8/1962 | Rotier | 244/77 M |
| 3,310,976 | 3/1967 | Bussell et al. | 73/65 |
| 3,415,979 | 12/1968 | Bussell et al. | 235/150.2 |
| 3,636,321 | 1/1972 | Kirschner | 235/150.2 |
| 3,847,445 | 11/1974 | Bissell et al. | 244/111 |
| 3,880,385 | 4/1975 | Reynolds | 244/77 M |

OTHER PUBLICATIONS

Hawkins, Instruments and Control Systems, Feb. 1965, pp. 89–93.

Primary Examiner—John W. Caldwell
Assistant Examiner—James J. Groody
Attorney, Agent, or Firm—Christensen, O'Connor, Garrison & Havelka

[57] ABSTRACT

To assure takeoff controllability of aircraft of the type having movably mounted stabilizers, a plurality of different stabilizer position ranges are established, any one of which may be selected by a range selector switch operated by the pilot. Proper pilot selection of an available stabilizer range depends on the gross weight and the location of the center of gravity of the loaded aircraft. This dependency is automatically accounted for by sensing the amount of load on the nose landing gear, by means of a pressure sensitive switch associated with the nose gear shock strut. The condition of the pressure switch indicates the proper range of stabilizer positions as a function of the gross weight and location of the aircraft's center of gravity. Circuit means compare the condition of the pressure switch with the position of the range selector switch and a range warning indicator is actuated if the nose loading requires a different stabilizer range. In another embodiment, the pressure sensitive switch is connected to a stabilizer range selector circuit for automatically selecting the proper range.

11 Claims, 4 Drawing Figures

AIRFOIL POSITION RANGE SELECTING, INDICATING AND WARNING SYSTEM FOR AN AIRCRAFT

BACKGROUND

The present invention relates to method and apparatus for establishing multiple, selectable position ranges within which a positionable airfoil of an aircraft is to be disposed for assuring controllability of the aircraft under certain predetermined flight conditions.

On certain existing aircraft, it is standard practice to designate a predetermined range of acceptable positions within which a movably mounted stabilizer airfoil is to be disposed prior to takeoff. The position of the stabilizer is referred to as the "trim". The acceptable range of trim settings may be calculated from the weight and balance of the aircraft, which refers to the gross weight and location of the center of gravity respectively. Although the gross weight and center of gravity will vary depending upon the load carried by the airplane, these variables can be taken into account in establishing the acceptable limits of the stabilizer position range. This permissible range is sometimes referred to as the "green band", inasmuch as a band of green paint is typically provided adjacent the stabilizer position indicator to define the position limits of the predetermined range.

Associated with the "green band" is a warning system, including position sensors in the form of limit switches disposed to be actuated by the movement of the stabilizer. By connecting the limit switches to actuate an alarm or other warning indicator, and disposing the switches at positions matching the limits of the "green band" on the stabilizer indicators, a means is provided for warning the pilot when the stabilizer position exceeds the predetermined limits. So long as the stabilizer is positioned by the pilot within the applicable green band, takeoff controllability is assured for any gross weight and/or center of gravity loading for which the aircraft has been certified.

Although the single green band range has been found satisfactory for many aircraft, larger airplanes having higher thrust engines and/or greater gross weight load capacity, exhibit reduced controllability for stabilizer positions within the previously utilized range. In order to maintain the same level of controllability, or to improve upon existing controllability, it has been found necessary to narrow the green band range. The narrower, single range green band in turn requires either a change in the permissible gross weight and center of gravity loading limits of the aircraft, or redesign of the aircraft elevator for increased pitch control authority. Neither of these alternatives is desirable.

SUMMARY OF THE INVENTION INCLUDING THE OBJECTIVES THEREOF

Accordingly it is an object of the present invention to provide method and apparatus that offers a plurality of selectable green band ranges each defining different allowable limits for the stabilizer position, and within which aircraft controllability is assured. The multiple green bands permit full utilization of the gross weight and/or center of gravity load limits of the aircraft without sacrificing controllability and without requiring redesign of the aircraft airfoils.

Another object of the present invention is to provide multiple green band ranges defining allowable stabilizer positions, within which takeoff controllability of the aircraft is assured, wherein the available ranges are selected in accordance with the gross weight and/or center of gravity loading of the aircraft as automatically monitored by sensing the load supported by a landing gear of the aircraft.

Another object of the present invention is to provide method and apparatus establishing a plurality of position ranges for a positionable airfoil of an aircraft, each range being selectable by the pilot, and including means for warning the pilot in the event an incorrect range has been selected.

Briefly, these objects are achieved by method and apparatus providing a plurality of position ranges within which a positionable airfoil of an aircraft can be disposed to assure controllability of the aircraft during a particular flight condition. More particularly, the invention pertains to a range of allowable positions for a positionable stabilizer airfoil of an aircraft to insure controllability of the airplane during takeoff. It has been discovered that the proper position of the stabilizer, referred to as the stabilizer trim setting, bears a unique relationship to the load supported by the landing gear located at the nose of the fuselage. Accordingly, by sensing the nose gear loading and selecting one of the available plurality of stabilizer position ranges in accordance therewith, the pilot is afforded a relatively broad range of safe trim settings based on the particular load condition of the airplane.

In one embodiment of the invention, method and apparatus are provided for selectively indicating the plurality of different ranges adjacent the indicator that displays the airfoil position. A selector switch under the control of the pilot, allows him to select one of the alternative ranges based upon preflight information concerning the load carried by the aircraft. Concurrently, the loading on the nose landing gear is sensed. Circuit means connected to the load sensing means and the selector switch, compare the range selected by the pilot at the selector switch and the condition of the load sensing means. By a predetermined relationship, if the condition of the load sensing means dictates a different range than that selected by the pilot, a range warning indicator means is actuated. Accordingly, in this embodiment, the landing gear load sensing means serves as a backup warning system for advising the pilot that the selected range is incorrect. The pilot thus has primary control over the range selection, allowing him to override, that is ignore, the range warning indicator is required.

Heretofore, the single green band range has been associated with a trim limit warning system responsive to limit switches operated by the actual position of the stabilizer airfoil. When the airfoil is moved to a position outside the defined limits of the range, the limit switches sense this condition and actuate an alarm. In the present invention, this trim limit warning system is modified to provide limit switches responsive to the movement of the stabilizer airfoil and matching the limits of each of the selectable green band ranges. The various sets of limit switches are connected to the selector switch by which the pilot selects the appropriate range, for enabling those particular limit switches matching the selected green band range.

In another embodiment of the invention, automatic selection of the green band range is effected by controlling the trim limit warning system directly in response to the condition of the landing gear load sensing means. In this case, the load sensing means automatically selects, through switching circuit means, the proper set of airfoil limit switches for defining the limits of the trim position warning system.

These and further features, objects and various advantages of the method and apparatus according to the present invention will become apparent to those skilled in the art from a consideration of the following detailed description and appended drawings of particular embodiments thereof.

DESCRIPTION

In general, the method and apparatus of the present invention provides for establishing a plurality of acceptable green band range limits for a positionable aircraft airfoil, such as a moveably mounted stabilizer, and for selecting one of the ranges in accordance with a sensed aircraft load on a landing gear adjacent one end of the fuselage, such as the nose landing gear.

Figure 1:
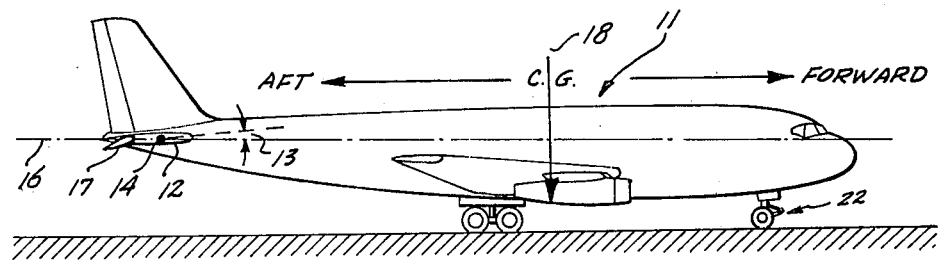
FIG. 1 is a plan view of an aircraft, diagrammatically indicating the location of the center of gravity relative to the forward and aft extremeties of the fuselage.

With reference to FIG. 1, aircraft 11 is of the type equipped with a positionable stabilizer airfoil 12 which can be set to a predetermined position to ensure controllability of the aircraft during takeoff. The position of stabilizer airfoil 12 is referred to as the trim, and represents an angular disposition, indicated at 13, of airfoil 12 as it is rotated about an axis 14 extending through the tail section, laterally of the longitudinal axis 16 of the aircraft. Jackscrews (not shown) located internally of the aircraft fuselage, afford positioning control over stabilizer airfoil 12 from the cockpit. Stabilizer airfoil 12 may in turn carry movably mounted elevators, such as elevator 17 and one or more trim tabs (not shown).

Depending upon the gross weight of the aircraft when loaded, and the location of its center of gravity, indicated by arrow 18, stabilizer airfoil 12 must be positioned within a predetermined range of trim settings in order to assure takeoff controllability. The gross weight and center of gravity location will of course vary depending upon the particular load carried by the aircraft.

Figure 2:
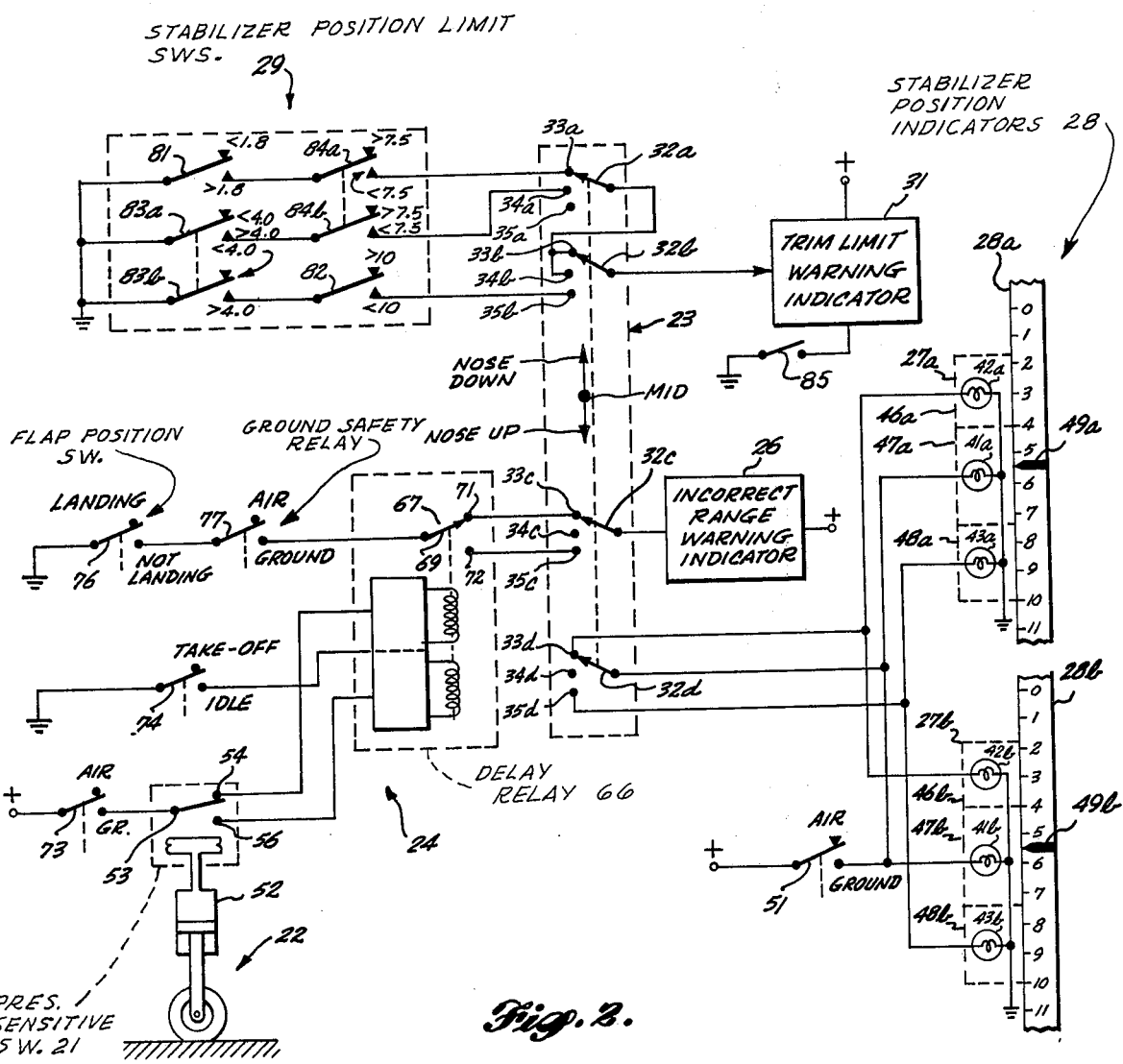
FIG. 2 is a diagram showing the circuitry, sensing devices, and indicators utilized in one embodiment of the present invention.

With reference to FIG. 2, the present invention is embodied in a position range selection and warning apparatus including a pressure sensitive switch 21 suitable for mounting on and sensing the pneumatic pressure in the shock absorber on the strut of the aircraft's nose landing gear 22. Pressure sensitive switch 21 thus provides a load sensing means for sensing the load force supported by a landing gear located adjacent one end of the fuselage, wherein this sensed load is a function of the gross weight and center of gravity location of the loaded aircraft. A manually operated, electromechanical selector switch 23 is disposed on a flight deck control panel for actuation by a pilot to select one of a plurality of available stabilizer position green band ranges. A comparison circuit 24 connected between pressure sensitive switch 21 and selector switch 23 is operative to energize an incorrect range warning indicator 26 in the event switch 23 is disposed in a green band range that is at variance with the load sensing condition of pressure sensitive switch 21. Multiple green band range indicators 27a and 27b, located adjacent the existing stabilizer airfoil position indicators 28a and 28b (one for each pilot), include a plurality of range indicating lamps, selectively energizable by selector switch 23 to define a plurality of indicating states. Each state corresponds to one of the available green band ranges and provides for illuminating the applicable range adjacent the position indicator. The combination of the multiple range indicator and stabilizer position indicator, afford each pilot a quick visual reference of both the stabilizer trim setting, and the available range of settings allowable for the particular load carried by the aircraft.

A plurality of limit switches 28 are mounted for actuation by the position of the stabilizer airfoil 12 to provide means for sensing the limits of each of the available green band ranges. Switches 29 are thus connected to selector switch 23 for enabling the proper sets of limit switches matching the selected green band range. A trim limit warning indicator 31 is connected to the enabled set of limit switches 29, through selector switch 23, to issue a warning indication to the pilot in the event the stabilizer airfoil is set outside of the applicable range.

In the operation of the embodiment of the invention shown in FIG. 2, selector switch 23 is provided with three positions, designated as follows: an airplane nose down position in which the switch wipers 32a, b, c and d contact terminals 33a, b, c and d; a nose up position in which wipers 32a–d contact terminals 35a, 35b, 35c and 35d; and a midband position in which the switch wipers contact terminals 34a, 34b, 34c and 34d. For reasons discussed more fully herein, the provision of a midband position, although preferable, is not essential.

When the nose down position of switch 23 is selected, a certain green band range is displayed by indicators 27a and 27b adjacent the associated position indicators 28a and 28b. In this embodiment, the range indicators are provided by selectively energized lamps, including midband lamps 41a and 41b, nose down range lamps 42a and 42b and nose up range lamps 43a and 43b for indicators 27a and 27b respectively. Each of these selectively energizable lamps is mounted within a partially transparent, light window which may be colored green. The windows are here indicated by the dotted line boxes 46a and 46b, 47a and 47b and 48a and 48b, and define selectable green band segments extending along side of indicators 28a and 28b respectively. Thus, for example, if lamps 41a and 42a of indicator 27 are in an energized state pursuant to a nose down position of selector switch 23, then an illuminated green band appears adjacent indicator 28a extending from approximately 1.5 trim units of approximately 7.5 trim units. By disposing switch 23 in the nose up position, lamps 42a and window 46a are turned off, while lamps 43a and window 48a become illuminated to define a green band extending from approximately 4 trim units to 10 trim units. The lamps associated with indicator 27b are operated in parallel with those of indicator 27a to provide the same display adjacent stabilizer airfoil position indicator 28b for the other pilot. Position indicator needles 49a and 49b mark the actual stabilizer airfoil position, set by manipulating the aforementioned screw jacks from the flight deck controls. A switch 51 selectively provides electrical power to and for operating the range indicator lights when the aircraft is on the ground prior to takeoff. For this purpose, the aircraft may be equipped with an existing ground safety relay having contacts serving as switch 51, which are open when the plane is in the air and closed when on the ground, prior to takeoff.

In utilizing the unique relationship between the load carried by nose landing gear 22 and the proper takeoff green band range for the stabilizer, numerous factors, other than the loading of the aircraft itself, affect the load on the shock strut. These factors produce a certain amount of error in the response of pressure sensitive switch 21 to the actual aircraft load and must be accounted for when correlating the response of switch 21 to the available green band ranges. The sources of error include main gear oleo servicing, main gear oleo static friction, surface contour of the landing strip upon which the aircraft is parked, transient loading due to engine thrust, braking, decelerating and rolling friction, etc. Additionally, the preferred embodiment of the invention monitors the nose gear load by sensing the pneumatic pressure within the shock strut, and it is known that this type of load sensing is subject to a certain amount of error caused by static and dynamic friction of the seals within the shock absorber.

Figure 3:
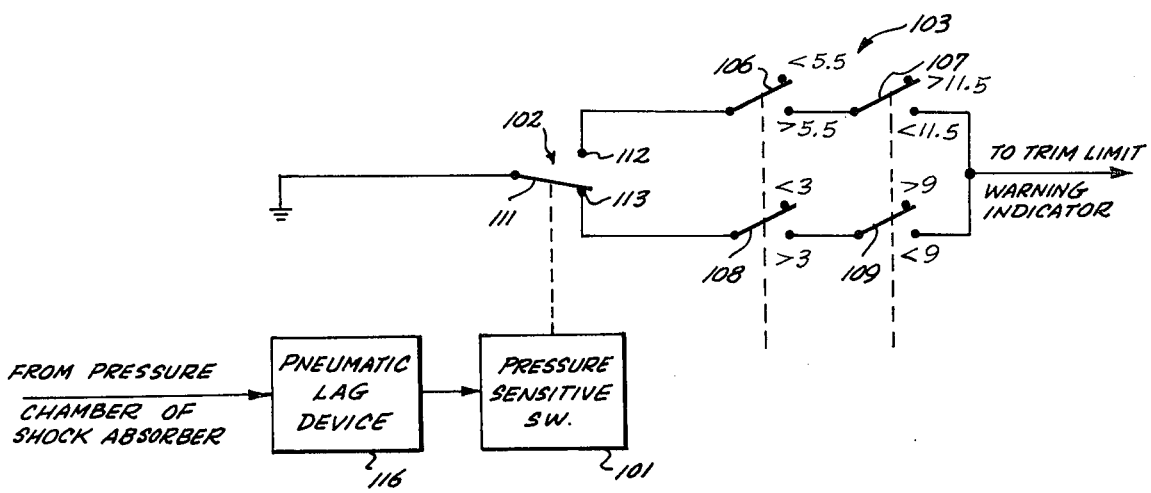
FIG. 3 is a composite block and schematic diagram of an alternative embodiment of the present invention.
Figure 4:
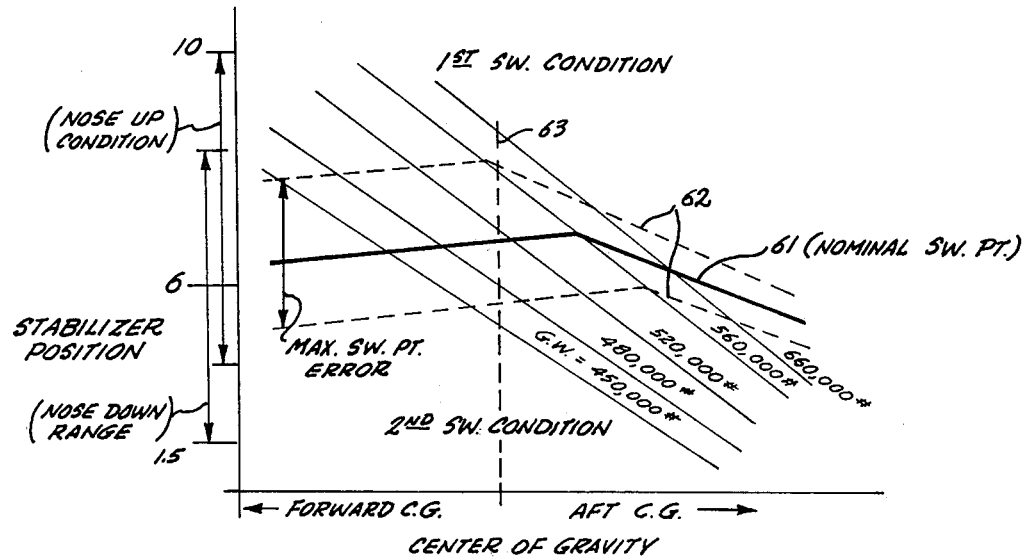
FIG. 4 is a graph illustrating an exemplary relationship between the stabilizer airfoil position, center of gravity of the loaded aircraft, gross weight of the aircraft, and the condition of a pressure sensitive switch associated with the nose landing gear to sense the load supported thereby.

Nevertheless, all of these errors may be reliably accounted for in the present invention by defining at least two green band ranges, each having a limit set outside the maximum anticipated tolerance or error in the response of switch 21 to the aircraft load. This is best understood by reference to FIG. 4, which illustrates an exemplary relationship between the condition of pressure sensitive switch 21 and the multiple green band ranges for the stabilizer of a particular aircraft. Pressure sensitive switch 21 is of a well-known construction, suitable for mounting the shock absorber 52 of landing gear 22, to respond to the internal hydraulic or pneumatic pressure of the shock, and in this case, assume one of two alternative switching conditions, either connecting wiper 53 with terminal 54 or with terminal 56 depending on the internal shock pressure. Referring to that disposition of switch 21 in which wiper 53 contacts terminal 54 as the first condition, and the disposition in which wiper 53 contacts terminal 56 as the second condition, the response of the switch to various gross weight and center of gravity loads of the aircraft can be correlated as shown in FIG. 3 to the nose up and nose down green band ranges. The nominal switching point of pressure sensitive switch 21 is indicated by line 61. Lying on opposite sides of line 61 are dotted lines 62 representing the maximum switching point error when all of the contributing factors, mentioned above, are accounted for. It will be observed, that in general, if the pressure sensitive switch 21 is in its first switch condition, the pilot should select the nose up green band range, whereas, the second switch condition requires a nose down green band range. The condition of the nose gear switch, and thus the proper green band range, depends both on the gross weight of the aircraft and the position of the center of gravity. In FIG. 4, the vertically extending dotted line 63 represents a nominal location for the center of gravity, whereas regions to the right of dotted line 63 represent an aft center of gravity (C.G.), and regions to the left of line 63 represent a forward C.G.. Thus, for a nominal center of gravity position, it will be noted that an increasing gross weight will result in a switching point for pressure sensitive switch 21 at approximately 500,000 pounds gross weight, corresponding to approximately 50,000 pounds of nose gear load. For the same gross weight, a movement of the center of gravity aft, will cause switch 21 to assume the second switch condition, whereas a forward displacement of the C.G., disposes switch 21 in its first condition. The actual switching points of switch 21 may vary in accordance with the indicated, maximum error represented by dotted lines 62. However, it will be observed that the upper and lower limits of the nose up and nose down ranges are respectively set just outside of the maximum error switching points to prevent an error in the selection of the proper range.

Pressure sensitive switch 21 may be switched back and forth between its two conditions in response to certain transients in the load supported by nose landing gear 22. To prevent spurious actuation of indicator 26, a time delay is provided in the response by comparison circuit 24 to changes in the condition of pressure sensitive switch 21. While this time delay may be provided by any suitable means, such as the provision of a pneumatic lag means as utilized in the alternative embodiment of the invention described hereinafter, here an electrical or electromechanical delay is employed in the form of a relay 66 of the type having a time delay feature. Although the amount of time delay provided by relay 66 is not critical, by way of example, a 30 second delay is utilized in this embodiment. When a stable, consistent load condition is sensed by pressure sensitive switch 21, after the time delay of relay 66 has elapsed, contacts 67 thereof will assume one of two alternative positions. In a first position, wiper 69 contacts terminal 71 and corresponds to the first switch condition of pressure sensitive switch 21 and represents a heavy load on the aircraft nose either due to a forward C.G. or a relatively large gross weight. In a second position, wiper 69 contacts terminal 72 corresponding to the second switch condition of pressure sensitive switch 21, and representing an aft C.G. or a relatively light gross weight load.

In addition to the above described circuit components, the embodiment of the invention shown in FIG. 2 is adapted for interfacing with standard control switches available on at least certain aircraft. Thus, a set of contacts 73 of an existing ground safety relay (not shown) provide for supplying operating power to relay 66 via pressure sensitive switch 21 by assuming a closed condition when the aircraft is grounded. When airborne, relay contacts 73 open, removing electrical power from relay 66, causing it to mechanically latch in the last position it assumed in response to pressure sensitive switch 21. Additionally, to prevent the relay from switching back and forth in response to a variable load condition on landing gear 22 during takeoff, switch contacts 74 of an existing throttle lever position switch are connected to supply a ground return to the relay 66 for disabling its operation when the throttle lever is moved from an idle mode to a takeoff mode, causing the switch contact 74 to open. This prevents the relay from switching from its last established position prior to takeoff, thus assuring that the warning circuit displays consistent information during takeoff.

Relay contacts 67 of circuit 24 are serially connected to ground through switch contacts 76 of an existing flap position switch which are open during landing and otherwise closed, and switch contacts 77 of an existing ground safety relay which are closed when the aircraft is grounded and open when airborne. Thus, the incorrect range warning indicator 26 is disabled when the aircraft is airborne and/or after landing so long as the flaps remain in the landing position. During these conditions, warning indicator 26 has no significance to the safe operation of the aircraft.

Position limit switches 29 associated with the trim limit warning system here include a limit switch 81 that switches from a closed position (when stabilizer is within selected range) to an opened (when stabilizer is outside of selected range) position as the stabilizer trim setting crosses the lowermost limit of the nose down green band range. In this instance, and by way of example, switch 81 is set to switch at 1.8 units trim corresponding to the lower termination of green band windows 46a and 46b of range indicators 27a and 27b respectively. Similarly, switches 29 include switch 82 that switches from a closed position to an open position as the stabilizer trim setting crosses the uppermost limit of the nose up green band range, here set at 10 units trim; and a pair of ganged limit switches 83a and 83b and 84a and 84b. As indicated in FIG. 2, limit switch 84a opens when the stabilizer position exceeds 7.5 units and thus defines the upper trim limit of the nose down range. Limit switch 83b opens when the stabilizer position falls below 4.0 units and thus defines the lower trim limit of the nose up range. Swtiches 83a and 84b define the limits of a midband range the purpose of which is described herein, and provide switching points at 4 and 7.5 units trim respectively and are both closed so long as the stabilizer position remains between these limits. The various green band limits are selected as indicated above by the switching of wipers 32a and 32b of selector switch 23 at the time the pilot selects one of the three available ranges afforded by selector switch 23, for enabling trim limit warning indicator 31 to respond to the proper switching point limits when the switches 29 open indicating that the stabilizer has been positioned outside the selected limits. Indicator 31 may be disabled during an engine idling condition and armed (enabled) when an engine throttle is advanced by means of switch contacts 85, which may be provided by contacts of an existing switch associated with contacts 74.

Preferably, selector switch 23 provides a midband position lying between the nose down and nose up green bands for use in the following circumstances. It has been found that when the loading of the aircraft disposes switch 21 at or near its switching point, an undesirable intermittent range warning may be flashed by indicator 26, as switch 21 vacillates between its two conditions. This occurs in both the nose down and nose up range positions of switch 23. Accordingly, a midband range has been provided in which the range warning indicator 26 is disconnected from the contacts of relay 66, and is accordingly disabled. In such case, a narrower green band lying between the outer extensions of the nose down and nose up green bands, is displayed on range indicators 27a and 27b by energizing only the centermost indicator lamps 41a and 41b and associated windows 47a and 47b. It will be noted that the stabilizer airfoil must be positioned within this central, more limited green band, otherwise the trim limit warning indicator 31 will be activated. If the pilot wishes to move the stabilizer airfoil to either of the extreme green band limits, switch selector 23 must be moved to either the nose down or nose up position, thereby enabling range warning indicator 26.

With reference to FIG. 3, an alternative embodiment of the method and apparatus of the present invention is diagrammatically illustrated. In this case, the pressure sensitive switch is connected to automatically select the proper green band range by selectively enabling the limit switches of the trim limit warning system. A pressure sensitive switch 101 mounted similarly to switch 21 of FIG. 2, serves as a load sensing means having switch contacts 102 that assume one of two alternative conditions in response to the weight or load of the aircraft on the nose landing gear. Contacts 102 are connected in circuit with a plurality of position limit switches 103 cooperating with the positionable stabilizer airfoil in a manner similar to position limit switches 29. In this instance, limit switches 103 define two alternative ranges of stabilizer positions and for this purpose include a first set of serially connected limit switches 106 and 107 and a second set of serially connected limit switches 108 and 109. By way of example, limit switches 106 and 107 may establish position limits at 11.5 and 5.5 stabilizer trim units, and are enabled by contacts 102 assuming a condition in which a wiper 111 contacts terminal 112. Switches 108 and 109 provide limits of 9 and 3 units trim and are enabled by contacts 102 assuming a condition in which wiper 111 contacts terminal 113.

Pressure sensitive switch 101, as in the case of switch 21, changes condition in response to a predetermined load or weight applied to the landing gear. In this particular example, loads in excess of the predetermined switching point pressure, cause contacts 102 to assume a condition in which wiper 111 contacts terminal 112 enabling limit switches 106 and 107; whereas aircraft nose loads less than the predetermined switching point, cause contacts 102 to enable limit switches 108 and 109. When enabled, here corresponding to the closed condition, the limit switches define a circuit path through contacts 102 to ground, for operating a trim limit warning indicator similar or identical to indicator 31 of FIG. 2. Pressure switch 101 may also be connected to and for enabling range indicators, like indicators 27a and 27b of FIG. 2, for displaying the automatically chosen range to the pilot.

To avoid spurious fluctuations in the condition of pressure sensitive switch 101, a pneumatic lag device 116 is connected between pressure sensitive switch 101 and a pressure chamber of the landing gear shock absorber. Device 116 thus provides as a time delay, performing a function similar to time delay relay 66 of the embodiment of FIG. 2, in that short duration pressure transients are filtered out, allowing switch 101 to respond to shock pressures consistently above or below the predetermined switching pressure.

While only a limited number of particular embodiments of the present invention have been disclosed herein, it will be readily apparent to persons skilled in the art that numerous changes and modifications may be made thereto without departing from the spirit of the invention. For example, the embodiments of the present invention disclosed herein have utilized a pressure sensitive switch for sensing the amount of load at the nose landing gear. Other load sensing devices may be utilized, such as strain gauges, suitable for mounting on, or adjacent the landing gear for developing an electrical signal representing the load thereon.

In the embodiments disclosed herein, the load sensing means has been disposed on the nose gear of the aircraft, in conformity with the prevailing design of multi-engine aircraft. Alternatively however, the load sensing means can be disposed on a tail gear, if the aircraft is so equipped. The essential aspect here, is the ability to measure the aircraft load adjacent one end of the fuselage.

In the embodiment of the invention shown in FIG. 2, the range warning indicator 26 is responsive to a predetermined relationship between the position of the pilot's selector switch 23, as compared with the condition of pressure sensitive switch 21, and is independent of the actual position of the stabilizer. As an alternative embodiment, the system of FIG. 2 may be modified to provide for actuation of the warning range indicator by reason of an inconsistency between pressure switch 21 and selector switch 23 only when, and if, the stabilizer has been positioned outside of the nonselected range. For example, with reference to FIG. 3, if the pilot has selected the nose up range, and the pressure sensitive switch dictates a nose down range, the circuitry may be modified to trigger the warning indicator 26 only if the position of the stabilizer lies outside the nose down range by incorporating the position limit switches in the comparison circuitry. This avoids an unnecessary range warning indication, since the stabilizer lies within the correct range, but has the disadvantage of permitting the continued display of the incorrect range on the flight deck instruments.

Accordingly, the foregoing disclosure and description thereof are for illustrative purposes only and do not in any way limit the invention which is defined only by the following claims.

What is claimed is:

1. A position range selection and warning apparatus for a positionable airfoil of an aircraft comprising:
    airfoil position indicator means for displaying the position of an airfoil;
    range indicator means associated with said position indicator means and having first and second indicating states defining different, predetermined ranges of airfoil positions;
    selector switch means connected to said range indicator means and having first and second positions, said range indicator means being responsive to said switch means to alternatively assume said first and second indicating states when said switch means is in said first and second positions respectively;
    load sensing means associated with a landing gear that is located adjacent one end of the aircraft fuselage for producing a signal indicative of a load supported by such landing gear; and
    warning indicator means connected to said load sensing means and to said selector switch means and being responsive to a predetermined relationship between said signal produced by said sensing means and the positions of said switch means to produce a warning indication.

2. The apparatus set forth in claim 1, further comprising:
    additional warning indicator means; and
    position limit switch means responsive to the position of said airfoil and defining first and second sets of position limits matching said ranges, said limit switch means being connected to said selector switch means and to said additional warning indicator means for activating said additional warning indicator means when said switch means is in said first position and the airfoil is positioned outside of said first set of position limits and when said switch means is in said second position and the airfoil is positioned outside said second set of position limits.

3. The apparatus set forth in claim 1, wherein said range indicator means includes a plurality of selectively energizable lamps disposed adjacent said airfoil position indicator means and in which different ones of said lamps are energized in accordance with said first and second indicating states to indicate said predetermined ranges.

4. The apparatus of claim 1, wherein said landing gear includes a shock absorber having an internal fluid pressure representative of said load, and said load sensing means includes a pressure sensitive switch that is responsive to said internal fluid pressure.

5. The apparatus set forth in claim 1, further including a circuit means connecting said load sensing means and selector switch means to said warning indicator means, said circuit means including an electrical delay means for delaying said signal from said sensing means so that said warning indicator means is responsive to said predetermined relationship between said signal produced by said sensing means as delayed by said delay means and the position of said selector switch means.

6. The apparatus set forth in claim 1, wherein said predetermined ranges defined by said first and second states of said range indicator means overlap at a mid region of said airfoil position indicator means, and said range indicator means includes a third indicating state defining an additional, predetermined mid band range where said overlap occurs.

7. The apparatus set forth in claim 6, wherein said selector switch means includes a third position, said range indicator means being responsive to said switch means to assume said third state when said switch means is in said third position, said load sensing means including switching means having first and second conditions and assuming said first condition in response to a load supported by said landing gear that is in excess of a predetermined magnitude and assuming said second condition in response to a load supported by said landing gear that is less than said predetermined magnitude, and said warning indicator means being responsive to said selector switch means in its first position when said switching means of said load sensing means is in its first condition, and being responsive to said selector switch means in its second position when said switching means of said load sensing means is in its second condition, and said warning indicator means being nonresponsive to said load sensing means when said selector switch means is in its third position.

8. The apparatus set forth in claim 6, further comprising:
    additional warning indicator means; and
    position limit switch means responsive to the position of said airfoil and defining first, second and third sets of position limits respectively matching said predetermined ranges of airfoil positions, said selector switch means further including a third position to which said range indicator means is responsive so as to assume said third indicating state and in which the first mentioned said warning indicator means is non-responsive to said predetermined relationship, and said selector switch means further including means for selectively connecting said position limit switch means to said additional warning indicator means for activating said additional warning indicator means when said selector switch means is in its first position and the airfoil is positioned outside of said first set of position limits and when said selector switch means is in its second position and said airfoil is positioned outside said second set of position limits and when said selector switch means is in its third position and said airfoil is positioned outside said third set of position limits.

9. An airfoil position range selection and warning method for an aircraft having a positionable airfoil compising:
  indicating the position of the airfoil on a visual indicator;
  selecting one of a plurality of different, predetermined ranges of allowable airfoil positions by disposing a selector switch in one of a plurality of alternative positions;
  visually indicating the selected range adjacent the visual indicator of the airfoil position in accordance with the position of said selector switch;
  sensing a load that is supported by a landing gear in which the landing gear is located adjacent one end of the aircraft fuselage, and developing an electrical signal indicative of such load;
  producing a warning indication in response to the occurrence of a predetermined relationship between the step of selecting one of said ranges as determined by the position of said selector switch and the step of sensing said load as indicated by said electrical signal.

10. The method of claim 9, further including the steps of:
  mounting a plurality of sets of limit switches for actuation by the airfoil at positions thereof matching the limits of the respective said plurality of predetermined ranges;
  selecting different sets of said limit switches for operating an additional warning indicator in which the selected sets depend on the position of said selector switch; and
  electrically activating such additional warning indicator when the position of the airfoil exceeds the limits of the selected set of limit switches.

11. An apparatus for automatically setting range limits of a positionable airfoil of an aircraft comprising:
  load sensing means mountable on an aircraft for sensing a load supported by a landing gear in which such landing gear is located adjacent one end of the fuselage;
  limit switch means mountable on the aircraft for defining first and second sets of switching point position limits associated with different, predetermined ranges of airfoil positions, said limit switch means connected to said load sensing means for selectively, alternatively enabling said first and second sets of switching point position limits of said switch means depending on the load sensed by said load sensing means; and
  warning indicator means connected to said limit switch means for producing a warning indication in response to the airfoil being positioned outside of the set of switching point position limits enabled by said load sensing means.

* * * * *